United States Patent Office 2,859,112

Patented Nov. 4, 1958

2,859,112

QUINOLINE-QUINONE-(3,4) DIAZIDE PLATES

Oskar Süs, Wiesbaden-Biebrich, and Martin Glos, Wiesbaden, Germany, assignors to Azoplate Corporation, Summit, N. J., a corporation of New Jersey No Drawing. Application January 27, 1955
Serial No. 484,569

Claims priority, application Germany February 6, 1954

26 Claims. (Cl. 96—91)

This invention relates to the production of light sensitive material and its use in the manufacture of lithographic printing plates. More particularly, this invention is concerned with presensitized lithographic printing foils and sensitizing compounds therefor.

The ortho-quinone-diazides which can be produced by diazotizing o-amino-phenols have gained great technical importance. In the dyestuff industry, they serve as diazo components for the production of azo dyes, which may be transformed into color lakes by reaction with metal salts and are distinguished by an excellent fastness to light. Owing to their remarkable light-sensibility, the ortho-quinone-diazides are frequently used in the reproduction field for the manufacture of light-sensitive layers suitable for making diazotype prints. Here they are particularly suited for the production of so-called "dry-papers," i. e. papers coated with two-component layers, which contain the azo component as well as the diazo compound in the light-sensitive layer.

The o-quinone-diazides which have been used until now for the above mentioned purpose all belong to the same type of compounds, i. e. they are o-quinone-diazides having the quinone-diazide group in a carbocyclic 6-membered nucleus. The corresponding compounds with a heterocyclic 6-membered ring have been unknown previously for this purpose.

It is an object of the present invention to provide new compounds for use as light sensitive substances and a process for the preparation of such compounds. It is a further object of our invention to provide presensitized printing plates employing heterocyclic ortho-quinone-diazides as the light sensitive substance.

We have now found that heterocyclic o-quinone-diazides can be prepared by diazotizing o-hydroxy-amino-quinoline bodies and submitting the diazonium salts thus obtained to the influence of alakaline agents.

The o-hydroxy-amino-quinoline bodies as used in the present invention include the 3-amino-4-hydroxy-quinoline, which corresponds to the formula

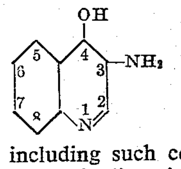

and its derivatives, including such compounds in which the benzene-ring of the quinoline ring system is present in a condensed form with other aromatic rings, for example, 6,7-benzo-quinoline.

A method for preparing 3-amino-4-hydroxy-quinoline is described by G. B. Bachmann et al. in "The Journal of the American Chemical Society," vol. 69 (1947), p. 365 et seq. This method consists of causing o-amino-benzene-carboxylic acids to react with methazonic acid, i. e. the oxime of nitroacetaldehyde, and acting upon the reaction product thus obtained with acetic acid anhydride at about 120° C. in order to bring about formation of a ring. Said method can be used in an analogous manner for the preparation of other 3-amino-4-hydroxy-quinoline bodies.

On coupling with azo components, the new heterocyclic o-quinone-diazides produce dyestuffs which are very fast to light and form color lakes by reaction with metal salts. Owing to their good light-sensitivity they are well suited for the preparation of light-sensitive layers on material for photo-mechanical reproduction, e. g. for the diazotype process. They are exceptionally stable and are particularly suitable for the production of light-sensitive material on a base carrier. As far as light sensitive material for lithographic processes is concerned, metallic base carriers are preferred, however, zinc, aluminum or glass plates, lithographic stone, as well as aluminum foils, parchment paper, etc., may be used as bases.

The base carrier is coated with the ortho-hydroxy-amino-quinolines dissolved in an organic solvent, such as alcohol or dioxane, or mixtures thereof, glycol-mono-methyl-ether or methyl ethyl ketone, pyridine bases or combinations of these solvents. The coating may be performed by brushing, spraying, rolling, plate-whirling or immersing of the plate into the solution. By exposing this material under a transparent original, an image is obtained which can be transformed into a printing image by a simple alkaline development. Positive printing plates, from which positive prints can be made, are obtained from positive originals.

The following formulae are inserted for the purpose of illustrating the examples which follow. In the examples only the method of preparing the specific compounds has been described since the steps of coating, exposing and developing are considered to be readily apparent from the above description.

FORMULA 1

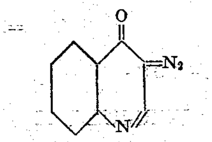

FORMULA 2

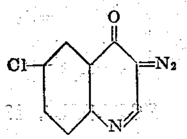

FORMULA 3

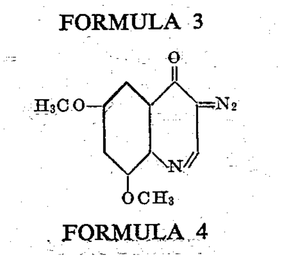

FORMULA 4

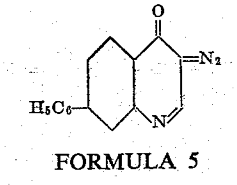

FORMULA 5

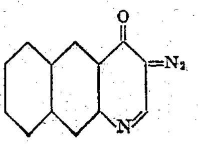

FORMULA 6

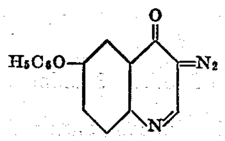

FORMULA 7

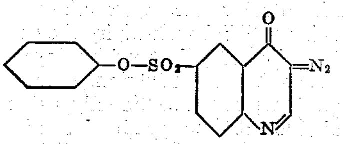

FORMULA 8

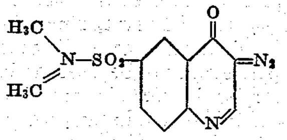

FORMULA 9

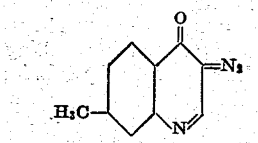

FORMULA 10

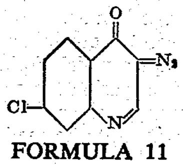

FORMULA 11

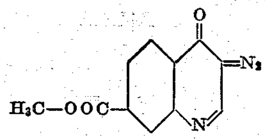

FORMULA 12

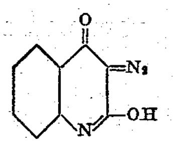

FORMULA 13

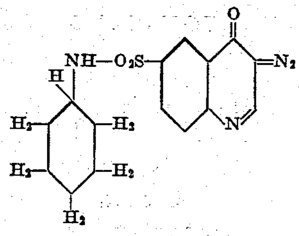

FORMULA 14

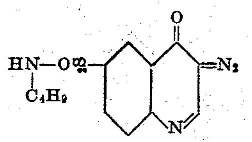

*Example 1.—Quinoline-Quinone-(3,4)-diazide-(3).*

20.5 g. of 3-amino-4-hydroxy-quinoline-hydrochloride as produced according to the directions given by G. B. Bachmann et al. in "Journal of the American Chemical Society," vol. 69 (1947), pp. 365, are suspended in 60 ccm. of hydrochloric acid (1:1) and then diazotized at a temperature of 0–5° C. with a solution of 6.5 g. sodium nitrite in 25 ccm. of water. The reaction mixture is stirred for half an hour, whereupon the diazonium salt precipitates in the form of an almost colorless deposit. The diazonium salt is drawn off and thoroughly mixed with an excess of concentrated sodium carbonate solution. A yellow oil is first formed, which after a short rubbing with a glass rod, becomes crystalline and is purified by recrystallization from benzene or a benzene-petroleum ether mixture. Thus 16.5 g. of a golden-yellow compound in the form of flakes are obtained which melt at 129–130° C. under decomposition.

*Example 2.—6-chloro-quinoline-quinone-(3,4)-diazide-(3)*

12.5 g. of 5-chloro-2-amino-benzoic acid are dissolved in a mixture of 145 cc. of water and 15 cc. of concentrated hydrochloric acid, and then condensed with methazonic acid according to the directions given by Bachmann in "Journal of the American Chemical Society," vol. 69 (1947), p. 365 et seq. 13 g. of the 5-chloro-2-($\beta$-nitro-ethylidene)-amino-benzoic acid are obtained which decomposes at 209–210° C. This condensation product is treated in acetic acid anhydride with anhydrous sodium acetate for the purpose of bringing about the desired ring formation, and care must be taken that the temperature inside the reaction vessel does not exceed 110° C. The yield of 6-chloro-3-nitro-4-hydroxy-quinoline, which decomposes at 332° C., amounts to 4.3 g. This compound is suspended in methanol mixed with some concentrated ammonia, and then catalytically reduced after adding Raney-nickel. The hydrochloride of the 6-chloro-3-amino-4-hydroxy-quinoline forms colorless crystals which decompose at 330° C.

3 g. of this hydrochloride are dissolved in 40 cc. of hydrochloric acid (1:1) while moderately heating. The solution is then cooled down to 20° C. and diazotized at this temperature by adding in droplets 5.5 cc. of a 2n-sodium-nitrate solution. After cooling, the precipitated reaction product is sucked off and intimately mixed with a concentrated solution of sodium carbonate. Hereby the color of the crystalline mass turns from white to yellow. After recrystallization from a monomethyl-glycol-ether/water mixture, the 6-chloro-quinoline-quinone-(3,4)-diazide-3 forms yellow crystals, which slowly darken when heated over 100° C. and decompose at about 155° C.

*Example 3.—6,8-dimethoxy-quinoline-quinone-(3,4)-diazide-(3)*

By way of condensing 18.5 g. of the 2-amino-3,5-dimethoxy-benzoic acid with methazonic acid according to the directions given by Bachmann, 12 g. of 3,5-dimethoxy-2-($\beta$-nitro-ethylidene)-amino-benzoic acid in the form of yellow-orange colored crystals are obtained which melt at 172–173° C. Closing of the ring to form 6,8 - dimethoxy - 3 - nitro - 4 - hydroxy - quinoline is effected under the same conditions as described in Example 2. The compound decomposes at 310° C. 18.5 g. of 2-amino-3,5-dimethoxy-benzoic acid yield 4 g. of 6,8-dimethoxy-3-nitro-4-hydroxy-quinoline. Reduction of this product to 6,8-dimethoxy-3-amino-4-hydroxy-quinoline is performed by suspending the nitro-compound in dimethyl formamide and reducing catalytically in the presence of Raney-nickel. 10 g. nitro compound yield 7.5 g. amino compound in the form of its hydrochloric acid salt, forming colorless crystals which decompose at temperatures over 250° C. The crystals are made up with 20 cc. of concentrated hydrochloric acid into a thin paste and then diazotized with 7.5 cc. of a 2n-sodium nitrite solution under constant stirring and cooling with ice. The colorless diazonium salt which precipitates is sucked off and triturated with a concentrated sodium carbonate solution. After recrystallization from a benzene/petroleum-ether mixture, the 6,8-dimethoxy-quinoline-quinone-(3,4)-diazide- (3) forms lemon yellow-colored crystals which decompose at about 150° C. after preliminary darkening.

*Example 4.—7-phenyl-quinoline-quinone-(3,4)-diazide-(3)*

By condensing 21.3 g. of 3-amino-diphenyl-4-carboxylic acid with a methazonic acid solution, 24 g. of 3-(β-nitro-ethylidene)-amino-diphenyl-4-carboxylic acid are obtained, which is yellow-brown colored and decomposes at 188° C. By treatment of the condensation product with anhydrous sodium acetate in acetic acid anhydride ring closure occurs under formation of 7-phenyl-3-nitro-4-hydroxy-quinoline, which decomposes at 337–338° C. This compound is reduced with sodium-dithionite ($Na_2S_2O_4$) in an alkaline solution to form the corresponding 3-amino-compound, the hydrochloride of which forms colorless crystals at the decomposition point 292–294° C. In order to convert it into 7-phenyl-quinoline-quinone-(3,4)-diazide-(3), the free 7-phenyl-3-amino-4-hydroxy-quinoline is dissolved in as little as possible of warm dimethyl-formamide, the solution is cooled down, mixed with the calculated amount of 2n-sodium-nitrite solution and then acidified by adding concentrated hydrochloric acid, while stirring and cooling. After a short time, a diazonium salt precipitates which is drawn off and intimately mixed with concentrated sodium carbonate solution. Recrystallized from monomethyl-glycolether, the 7-phenyl-quinoline-quinone-(3,4)-diazide-(3) forms yellow crystals, which decompose by heating at about 155° C., after previously changing color.

The 3-amino-diphenyl-4-carboxylic acid is obtained as follows:

3-nitro-4-cyano-diphenyl is saponified by boiling it for several hours in a mixture consisting of 70 parts by vol. of concentrated sulphuric acid, 100 parts by vol. of water, and 70 parts by vol. of glacial acetic acid, and yields 3-nitro-diphenyl-4-carboxylic acid. This compound, forming colorless crystal needles, melts at 196° C. By hydrogenizing it in an alcoholic solution, using Raney nickel as a catalyst, the colorless crystals of the 3-amino-diphenyl-4-carboxylic acid are obtained which melt at 219–220° C.

*Example 5.—6,7-benzo-quinoline-quinone-(3,4)-diazide-(3)*

According to the directions given by Bachmann as cited above, 13 g. of 2,3-amino-naphthoic acid, which were dissolved in a mixture of 350 cc. of water and 20 cc. of concentrated hydrochloric acid, are condensed at a temperature of 28–30° C. with a methazonic acid solution prepared from 9 g. of nitro-methane. 2-(β-nitro-ethylidene)-amino-3-naphthoic acid is obtained. The condensation product precipitates in the shape of crystals, when the two solutions are mixed. The crystals are then dissolved in dimethyl-formamide and again precipitated by adding water. 9 g. of the purified substance are obtained which decomposes at 205–206° C.

3.5 g. of this compound are dissolved in 25 cc. of acetic acid anhydride, the solution is heated to a temperature of 110–120° C. (internal temperature) and 1.3 g. of freshly calcined sodium acetate are added, whereupon 1.7 g. of 4-hydroxy-3-nitro-6,7-benzo-quinoline with the decomposition point 372–374° C. precipitate. In order to transform it into 4-hydroxy-3-amino-6,7-benzo-quinoline, 6 g. of said nitro compound are suspended in a mixture of 300 cc. of methanol and 3 cc. of 25% ammonia water and pressure-reduced with hydrogen at room temperature in an autoclave in the presence of Raney-nickel. On addition of hydrochloric acid to the reduction solution after drawing it off from the catalyst, 4 g. of the 4-hydroxy-3-amino-6,7-benzo-quinoline hydrochloride precipitate in the shape of a crystalline mass.

3 g. of this hydrochloride are thoroughly mixed with 12 cc. of hydrochloric acid, then dissolved in 600 cc. of hot water, and, after the solution has cooled down to 35–40° C., it is mixed with 8.5 cc. of 2n-sodium nitrite solution. The diazotization mixture is cooled down to 5° C. and drawn off. Thus 2.1 g. of the diazonium chloride of 6,7-benzo-quinoline-quinone-(3,4)-diazide-(3) are obtained which, upon treatment with a 10% sodium carbonate solution, yield the greenish-yellow quinone-diazide. The quinone-diazide is purified by dissolving it in monomethyl-glycol ether and adding water to the solution. The purified product thus obtained melts at 143° C. under decomposition.

In a similar manner other quinoline-quinone-diazides may be prepared in which the benzene ring of the quinoline ring system is present in a condensed form with other aromatic rings, e. g. 6,7-(methyl-benzo)-quinoline-quinone-(3,4)-diazide-(3); 6,7-(ethoxy-benzo)-quinoline-quinone-(3,4)-diazide-(3); 6,7-naphtho-quinoline-quinone-(3,4)-diazide-(3); 6,7-(α-ethoxy-naphtho)-quinoline-quinone-(3,4)-diazide-(3), etc. also the other aromatic rings may be found at the 5,6 or the 7,8 position as well as the 6,7 position.

*Example 6.—6-phenoxy-quinoline-quinone-(3,4)-diazide-(3)*

64 g. of the 4-amino-diphenylether-3-carboxylic acid (hydrochloride) are dissolved in a mixture of 1400 cc. of water and 100 cc. of concentrated hydrochloric acid and then caused to react with methazonic acid according to the method of Bachmann. The 4-(β-nitro-ethylidene)-amino-diphenyl-ether-3-carboxylic acid is obtained in the form of a yellow powder, which melts at 159° C. with decomposition.

49 g. of this compound in admixture with 185 cc. of acetic acid anhydride and 17 g. of freshly calcined sodium acetate are heated up to 110–130° C. 22 g. of the 6-phenoxy-3-nitro-4-hydroxy-quinoline are obtained which melts at 342–344° C. with decomposition. 5 g. of this nitro compound are dissolved in methyl alcohol and after addition of Raney nickel as a catalyst and of 3 cc. of concentrated ammonia water to the solution, the nitro compound is catalytically reduced to form the 6-phenoxy-3-amino-4-hydroxy-quinoline, whereafter the reaction mixture is filtrated. Upon addition of hydrochloric acid to the concentrated filtrate, 4.5 g. of the hydrochloric salt of 6-phenoxy-3-amino-4-hydroxy-quinoline are precipitated in the form of a colorless crystalline powder. 2.9 g. of this hydrochloride are dissolved in a mixture of 300 cc. of water and 3 cc. of concentrated hydrochloric acid, and the solution is then diazotized as usual with 6 cc. of a 2n-sodium nitrite solution. The light-yellow colored diazonium chloride formed is drawn off and by digesting with a 10% sodium carbonate solution it is transformed into the lemon-colored 6-phenoxy-quinoline-quinone-(3,4)-diazide-(3). After recrystallization from benzene, the quinone-diazide decomposes when heated up to 141° C.

The 4-amino-diphenyl-ether-3-carboxylic acid used as starting material is prepared by condensing 1-chloro-4-nitro-benzene-3-carboxylic acid with phenol in nitrobenzene, and reducing the 1-phenoxy-4-nitro-benzene-3-carboxylic acid thus obtained (melting point 157° C.) in an alcoholic solution with Raney nickel as a catalyst.

*Example 7.—Quinoline-quinone-(3,4)-diazide-(3)-6-sulfonic-acid-phenyl-ester*

14.5 g. of the hydrochloride of 4-amino-benzene-1-sulfonic acid-phenyl-ester-3-carboxylic-acid are dissolved in a mixture of 300 cc. of glacial acetic acid and 360 cc. of 16% hydrochloric acid, and then condensed with methazonic acid at 60–70° C., following the method described by Bachmann, to form the 4-(β-nitro-ethylidene)-amino-benzene-1-sulfonic-acid-phenylester-3-carboxylic acid. Yield 12 g. The light-yellow product melts at 192° C. with decomposition. The condensation product is transformed into the 3-nitro-4-hydroxy-quinoline-6-sulfonic-acid-phenyl-ester (melting point 293° C., with decomposition) by heating in acetic acid anhydride in the presence of anhydrous sodium acetate.

10 g. of this 3-nitro-4-hydroxy-quinoline-6-sulfonic acid-phenyl-ester are poured into 300 cc. of a 10% sodium carbonate solution, dissolved by adding 300 cc. of water, and finally reduced by adding 20 g. of sodium-thionite. Yield 7 g. The 3-amino-4-hydroxy-quinoline-6-sulfonic acid phenyl ester thus obtained melts at 283° C. with decomposition.

7.5 g. of the above mentioned amino compound are dissolved in a mixture of 500 cc. of water and 30 cc. of a 32% hydrochloric acid solution, and then mixed with 20 cc. of a 2n-sodium-nitrite solution. The diazotization mixture is mixed with a 10% sodium carbonate solution until the neutral point is reached, whereupon the corresponding quinoline - quinone - (3,4) - diazide-(3) precipitates as a yellow, crystalline mass. Yield 6 g. It melts at 142° C. with decomposition.

The 4 - amino - benzene-1-sulfonic-acid-phenyl-ester-3-carboxylic acid used as starting material is prepared from the 1-amino-4-nitro-benzene-3-carboxylic acid, which is transformed into the 4-nitro-benzene-3-carboxylic-acid-1-sulfochloride (melting point 183° C.) by diazotization and addition of copper chloride to the diazotization mixture, with simultaneous introduction of gaseous $SO_2$. By causing the 4-nitro-benzene-3-carboxylic-acid-1-sulfochloride to react with potassium phenolate, the 4-nitro-benzene-1-sulfonic-acid-phenyl-ester-3-carboxylic acid (melting point 160° C.) is obtained which is then reduced catalytically.

*Example 8.—Quinoline-quinone-(3,4)-diazide-(3)-6-(N,N-dimethyl)-sulfonamide*

40 g. of the 4-aminobenzene-1-(N,N-dimehtyl)-sulfonamide-3-carboxylic acid, a compound which is obtained by condensing 4-nitro-benzene-3-carboxylic acid - 1 - sulfochloride with dimethylamine and subsequently reducing the 4-nitro-benzene-3-carboxylic acid-1-(N,N-dimethyl)-sulfonamide (melting point 201–202° C.), are dissolved in 2 liters of 16% hydrochloric acid and condensed with methazonic acid at 40° C. according to the method described by Bachmann, to form the 4-(β-nitro-ethylidene)-amino - benzene - 1 - (N,N - dimethyl) - sulfonamide - 3 - carboxylic acid. Yield 45 g. This compound is a yellow powder which melts at 253° C. with decomposition.

If this compound is heated up to 110–130° C. in acetic acid anhydride, while anhydrous sodium acetate is present, the 3-nitro-4-hydroxy-quinoline-6-(N,N-dimethyl)-sulfonamide is obtained which melts at 342° C. with decomposition.

By catalytically reducing in an autoclave the above mentioned nitro compound in methanol, to which some concentrated ammonia water was added, the 3-amino-4-hydroxy-quinoline-6-(N,N-dimethyl)-sulfonamide is obtained, which is diazotized. When as much of a 10% sodium carbonate solution is added to the diazotization solution so as to render it weakly alkaline, the quinoline-quinone - (3,4) - diazide - (3) - 6 - (N,N - dimethyl) - sulfonamide precipitates in the form of straw-yellow colored flakes, which melt at 150° C. with decomposition.

*Example 9.—7 - methyl - quinoline - quinone - (3,4)-diazide-(3)*

28 g. of the 4-methyl-2-amino-benzoic acid are condensed with methazonic acid, which was prepared from 20 g. of nitro-methane. The 4-methyl-2-(β-nitro-ethylidene)-amino-1-benzoic acid thus obtained is a lemon colored powder which melts at 217° C. with decomposition.

This compound is dried at 110° C. and then 30 g. thereof are heated with 150 cc. acetic acid anhydride to 100–105° C. with constant agitation. After about 10 minutes a clear slightly yellow colored solution is formed. 15 g. of freshly calcined sodium acetate are added simultaneously to this solution and the reaction mixture is heated to boiling for another 10 minutes. When the almost colorless reaction solution is slowly cooled down, the 7-methyl-3-nitro-4-hydroxy-quinoline precipitates. It is drawn off, washed with glacial acetic acid and water, and then dried. For purification, the crude reaction product is recrystallized from a mixture of glycol monomethyl ether and dimethyl formamide. It melts at 350° C. with decomposition.

8 g. of the nitro compound are suspended in 120 cc. of methanol and 2.5 cc. of a concentrated aqueous solution of ammonia, and it is then reduced by adding about 5 g. of Raney-nickel. The solution is filtered and then 6 cc. of pure hydrochloric acid are added, thus causing the hydrochloride of 7-methyl-3-amino-4-hydroxy-quinoline to precipitate. It forms colorless crystals which on heating to 270–280° C. turn dark, but do not melt.

8 g. of the di-amino-hydrochloride are intimately mixed with 10 cc. of a 32% hydrochloric acid and 50 cc. of water. While vigorously agitating, 22 cc. of a 2n-sodium nitrite solution are added drop by drop to this suspension at 10–15° C., whereupon the amine dissolves. The yellow colored solution of the diazonium salt thus formed is filtered with animal charcoal and by adding an excess of 10% soda solution the pale yellow-colored quinone-diazide is caused to precipitate from the filtrate. The quinone-diazide is drawn off, washed with water, and recrystallized from ethanol. Small needles are obtained which frequently form into bunches and melt at 153° C.

*Example 10.—7 - chloro - quinoline - quinone - (3,4)-diazide-(3)*

8 g. of 7-chloro-4-hydroxy-quinoline, which was prepared according to a method described by C. C. Price and R. N. Roberts in "Journal of the American Chemical Society," vol. 68 (1946), page 1204, are suspended in 80 cc. of nitric acid (d=1.4) in a flask, and the mixture is then heated, with reflux, to the boiling point for 1 hour. After cooling down, the content of the flask is poured into 200 cc. of ice water while agitating. The yellow colored 3-nitro-4-hydroxy-7-chloro-quinoline precipitates, which is drawn off and washed neutral with water. The compound may be recrystallized from dimethyl formamide and begins to melt at 352–355° C. with decomposition, after having turned dark at 341° C.

2.3 g. of this compound are dissolved by heating in a mixture of 100 cc. of 50% aqueous methanol and 5 cc. of 2n-soda lye, and then catalytically reduced by adding 3 g. of Raney-nickel. The reaction mixture is drawn off from the catalyst and the hydrochloride of the 3-amino-4-hydroxy-7-chloro-quinoline (which forms almost colorless crystals) is caused to precipitate from the solution by adding concentrated hydrochloric acid. The hydrochloride is recrystallized by dissolving it in about 95 cc. of hot water. It is obtained in the form of silky flakes which upon heating turn into a greenish-yellow, but regain their original color when cooled down.

1.2 g. of the above mentioned hydrochloride are suspended in 20 cc. of dimethyl formamide and then mixed with 20 cc. of a 15% hydrochloric acid while cooling with ice and stirring. 1 cc. of a 40% sodium nitrite solution is slowly added to this suspension over a period of 20 minutes with constant agitation. The amino compound dissolves slowly. The solution is filtered and, while agitating and cooling with ice, rendered weakly alkaline by adding a 10% sodium carbonate solution. The quinone-diazide precipitates in the form of crystals. It is drawn off and washed successively with water, methanol and ethyl ether. It forms yellow, entangled needles which melt at 160° C. with spontaneous decomposition.

*Example 11.—Quinoline -quinone - (3,4) - diazide - (3) 7-carboxylic acid-methyl ester*

11.7 g. of 1-carboxy-2-amino-4-benzoic acid-methyl ester are suspended in 350 cc. of a 16% hydrochloric acid and dissolved by adding 400 cc. of water. The solution is filtered and then mixed with a solution of methazonic acid while stirring. After a short time the yellow colored condensation product begins to precipitate. The reaction mixture is stirred for another 5–6 hours and then the condensation product, i. e. the 1-carboxy-2-(β-nitro-ethylidene)-amino-4-benzoic acid-methyl ester, is drawn off and washed with water. It is recrystallized from dioxane containing water and melts at 216° C. with decomposition.

13 g. of this compound are heated to 105° C. in acetic acid anhydride, to which anhydrous sodium acetate has been added. The compound is thereby converted into the 3 - nitro - 4 - hydroxy- - quinoline - 7 - carboxylic acid-methyl ester. After recrystallization from glycol monomethyl ether the weakly yellow colored substance decomposes at 330° C. after turning dark.

6 g. of the nitro compound are dissolved in about 500 cc. of methanol and then reduced at 65° C. adding 15 cc. of Raney-nickel. The reaction solution is filtered off from the catalyst and evaporated in a vacuum until the yellow colored 3-amino-4-hydroxy-quinoline-7-carboxylic acid-methyl ester separates in the form of crystals. After recrystallization from methanol the compound turns black when heated to 260° C. in a melting point tube.

To 3 g. of this amino compound are added first 5 cc. of a 32% hydrochloric acid and then 30 cc. of water. 10 cc. of 2n-sodium nitrite solution are then added drop by drop to the suspension while stirring and cooling with ice. The yellow diazonium chloride solution is then filtered with animal charcoal and as much as a 10% sodium bicarbonate solution is added necessary to render the filtrate weakly alkaline, whereupon the quinone-diazide precipitates in the form of small yellow needles. After recrystallization from methanol the quinone-diazide melts at 275° C. with decomposition.

*Example 12.—2-hydroxy-quinoline-quinone-(3,4)-diazide-(3)*

1.8 g. of the 2,4-di-hydroxy-quinoline prepared according to the method described by Erdmann in "Berichte der Deutschen Chemischen Gesellschaft," vol. 32 (1899), page 3570, are slowly suspended in 15 cc. of concentrated nitric acid ($d$=1.41) and then heated for 10 minutes in a steam bath. A red colored solution is obtained, from which, when it is cooled down, part of the nitration product precipitates in the form of fine yellow needles. By pouring the reaction mixture into 75 cc. of water the nitration product is completely precipitated. After recrystallization from glacial acetic acid the nitration product melts at 241° C.

1.6 g. of the nitro compound are suspended in a mixture of 25 mm. of ethanol and 25 cc. of water and then mixed with as much of a 20% caustic soda solution to dissolve the nitro compound. The reddish-brown solution is reduced at room temperature using Raney-nickel as a catalyst. The reduction solution is filtered with animal charcoal and the filtrate is mixed with 15 cc. of concentrated hydrochloric acid and then evaporated in a vacuum to about 15 cc. When the evaporated solution is cooled down the hydrochloride of 3 - amino - 2,4 - di - hydroxy-quinoline precipitates in the form of silky flakes.

3 g. of the amino-hydrochloride are suspended in 10 cc. of concentrated hydrochloric acid and to this suspension are added first 50 cc. of glacial acetic acid and then, while cooling and mechanically agitating, 1.3 g. of solid sodium nitrite are added in small particles. The diazotation solution is filtered with charcoal and mixed with water and sodium acetate solution. The quinone diazide precipitates, which is drawn off and washed with water. It forms cream-colored flakes and needles which melt at 228° C. under decomposition.

*Example 13.—Quinoline-quinone-(3,4)-diazide-(3)-6-sulfonic acid-cyclohexyl amide*

12 g. of 4-nitrobenzene - 3 - carboxylic acid - 1 - sulfonic acid-cyclohexyl amide (melting point 208° C.), which is prepared by condensing 4-nitrobenzene-3-carboxylic acid-1-sulfochloride with cyclohexyl-amine dissolved in dioxane, are reduced at about 70° C. in an aqueous solution mixed with sodium bicarbonate, using nickel as a catalyst. The reaction mixture is filtered and the filtrate is acidified with concentrated hydrochloric acid, whereupon the hydrochloride of 4-amino-benzene-3-carboxylic acid-1-sulfonic acid-cyclohexyl-amide separates in the form of a white precipitate. The reaction product melts at about 215° C. with decomposition.

9 g. of this amino compound are dissolved in a mixture of 100 cc. of glacial acetic acid, 13 cc. of about 32% hydrochloric acid and 40 cc. of water. At a temperature of 60–70° C. a methazonic acid solution, which is prepared from 5.36 g. of nitro-methane, is added to the solution of the amino compound. When the reaction mixture is cooled down the 4-(β-nitro-ethylidene)-aminobenzene-3-carboxylic acid-1-sulfonic acid-cyclohexylamide crystallizes out in the form of yellow crystals. It is purified by dissolving it in a sodium bicarbonate solution and re-precipitating by adding dilute hydrochloric acid. It melts at 206–207° C. with decomposition.

6.4 g. of the 4-(β-nitro-ethylidene) aminobenzene-3-carboxylic acid-1-sulfonic acid-cyclohexylamide are heated for about 5 minutes to 140° C. (temperature of the bath), in 18 cc. of acetic acid anhydride and 2.5 g. anhydrous sodium acetate. When the reaction mixture is cooled down the 3-nitro-4-hydroxy-quinoline - 6 - sulfonic acid-cyclohexyl amide precipitates as a colorless crystalline mass, which is drawn off, digested with 50% acetic acid and then washed with water. The reaction product is purified by dissolving it in an alkaline agent and re-precipitating it by adding hydrochloric acid to the solution. 4.2 g. of this hydroxy compound are dissolved in a mixture consisting of 70 cc. of an 8% caustic soda solution and 70 cc. of water. 10 g. of sodium-dithionite are added to the solution at 50–70° C. By acidifying the reduction solution with dilute acetic acid the 3-amino-4-hydroxy-quinoline-6-sulfonic acid-cyclohexyl amide precipitates as a gelatinous precipitate. The product is drawn off and thoroughly dried. It melts at 285° C. under decomposition after having turned brown at 200° C. The wet amino compound, which is sensitive to air, is diazotized as usual. The diazonium chloride solution is neutralized with a 10% sodium bicarbonate solution, whereupon the quinone-diazide separates in the form of a pale yellow colored crystalline precipitate, which is re-crystallized from dioxane. Rhomboid crystals are obtained which melt at 154° C. with decomposition.

The quinoline-quinone-3,4,diazide-(3) - 6 - sulfonic acid-(n)-butylamide (Formula 14) is prepared analogously. After recrystallizing the raw product from methanol the compound is obtained in the form of yellow colored crude prisms which melt at 162° C. with decomposition.

What we claim as our invention is:

1. A compound having the formula:

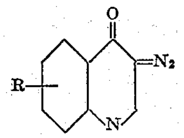

in which R is an esterified sulfo-group.

2. A compound having the formula:

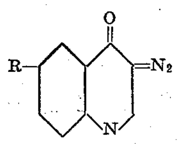

in which R is an esterified sulfo-group.

3. A compound having the formula:

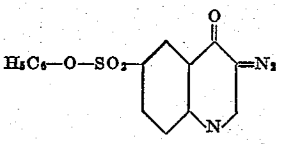

4. A presensitized printing plate comprising a base material coated with a thin uniform layer of a quinolinequinone-(3,4)-diazide as a light-sensitive material.

5. A presensitized printing plate comprising a base material coated with a thin uniform layer of a compound having the formula:

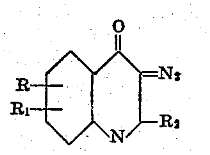

in which R and $R_1$ are selected from the group consisting of hydrogen, halogen, alkyl, aryl, alkoxy, aryloxy, esterified —$SO_3H$, esterified carboxyl, and sulfonamide radicals; R and $R_1$ taken together form at least one fused ring; and $R_2$ is selected from the group consisting of hydrogen and a hydroxyl group, as a light-sensitive material.

6. A presensitized printing plate comprising a base material coated with a thin uniform layer of a compound having the formula:

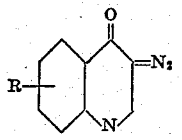

in which R is halogen, as a light-sensitive material.

7. A presensitized printing plate comprising a base material coated with a thin uniform layer of a compound having the formula:

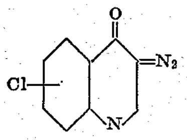

as a light-sensitive material.

8. A presensitized printing plate comprising a base material coated with a thin uniform layer of a compound having the formula:

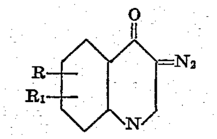

in which R and $R_1$ are alkoxy radicals, as a light-sensitive material.

9. A presensitized printing plate comprising a base material coated with a thin uniform layer of a compound having the formula:

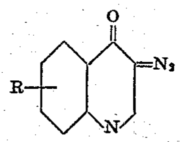

in which R is an alkoxy radical, as a light-sensitive material.

10. A presensitized printing plate comprising a base material coated with a thin uniform layer of a compound having the formula:

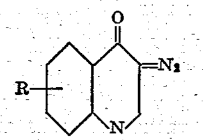

in which R is an aryl radical, as a light-sensitive material.

11. A presensitized printing plate comprising a base material coated with a thin uniform layer of a compound having the formula:

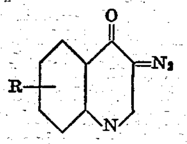

in which R is at least one fused ring, as a light-sensitive material.

12. A presensitized printing plate comprising a base material coated with a thin uniform layer of a compound having the formula:

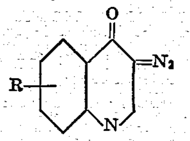

in which R is an aryloxy radical, as a light-sensitive material.

13. A presensitized printing plate comprising a base material coated with a thin uniform layer of a compound having the formula:

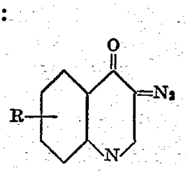

in which R is an esterified sulfo-group, as a light-sensitive material.

14. A presensitized printing plate comprising a base material coated with a thin uniform layer of a compound having the formula:

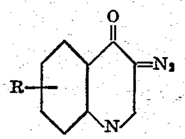

in which R is a sulfonamide radical, as a light-sensitive material.

15. A presensitized printing plate comprising a base material coated with a thin uniform layer of a compound having the formula:

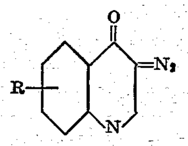

in which R is an esterified carboxyl radical, as a light-sensitive material.

16. A presensitized printing plate comprising a base material coated with a thin uniform layer of a compound having the formula:

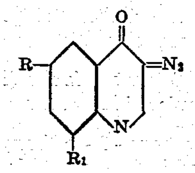

in which R and $R_1$ are alkoxy radicals, as a light-sensitive material.

17. A presensitized printing plate comprising a base material coated with a thin uniform layer of a compound having the formula:

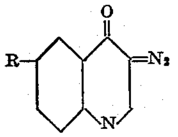

in which R is an aryloxy radical, as a light-sensitive material.

18. A presensitized printing plate comprising a base material coated with a thin uniform layer of a compound having the formula:

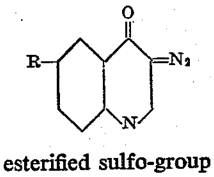

in which R is an esterified sulfo-group radical, as a light-sensitive material.

19. A presensitized printing plate comprising a base material coated with a thin uniform layer of a compound having the formula:

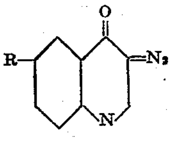

in which R is a sulfonamide radical, as a light-sensitive material.

20. A presensitized printing plate comprising a base material coated with a thin uniform layer of a compound having the formula:

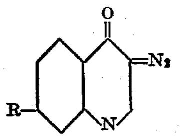

in which R is an esterified carboxyl radical, as a light-sensitive material.

21. A presensitized printing plate comprising a base material coated with a thin uniform layer of a compound having the formula:

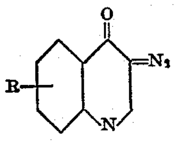

in which R is an alkyl radical, as a light-sensitive material.

22. A presensitized printing plate comprising a base material coated with a thin uniform layer of a compound having the formula:

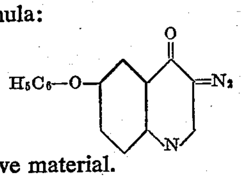

as a light-sensitive material.

23. A presensitized printing plate comprising a base material coated with a thin uniform layer of a compound having the formula:

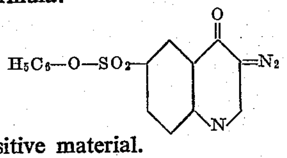

as a light-sensitive material.

24. A presensitized printing plate comprising a base material coated with a thin uniform layer of a compound having the formula:

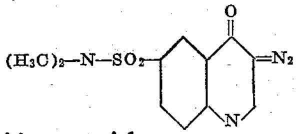

as a light-sensitive material.

25. A presensitized printing plate comprising a base material coated with a thin uniform layer of a compound having the formula:

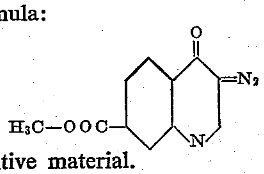

as a light-sensitive material.

26. A presensitized printing plate comprising a base material coated with a thin uniform layer of a compound having the formula:

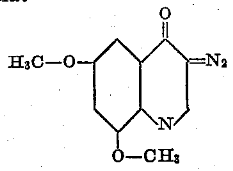

as a light-sensitive material.

References Cited in the file of this patent

UNITED STATES PATENTS 2,065,879 Ach et al. ---------------- Dec. 29, 1936

FOREIGN PATENTS 467,145 Great Britain ------------ June 11, 1937

OTHER REFERENCES

Bachmann et al.: J. A. C. S., vol. 69 (1947), pages 365–370.

Saunders: The Aromatic Diazo Compounds (1947), publisher Edward Arnold and Co., London, pages 28 to 35.